Dec. 10, 1968   E. HENRY-BIABAUD   3,415,579
HYDRAULIC-CONTROL BRAKE SYSTEMS OF VEHICLES
Filed July 10, 1967   4 Sheets-Sheet 1
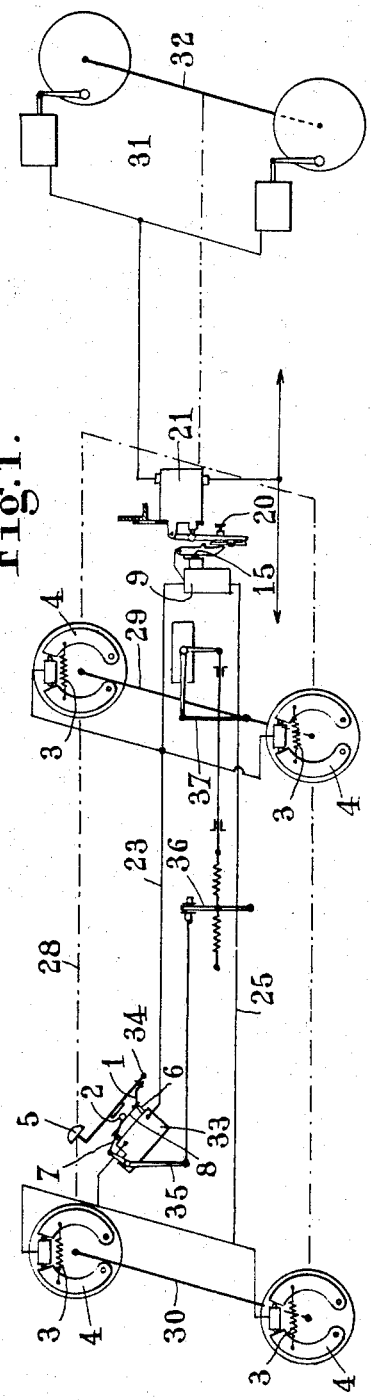
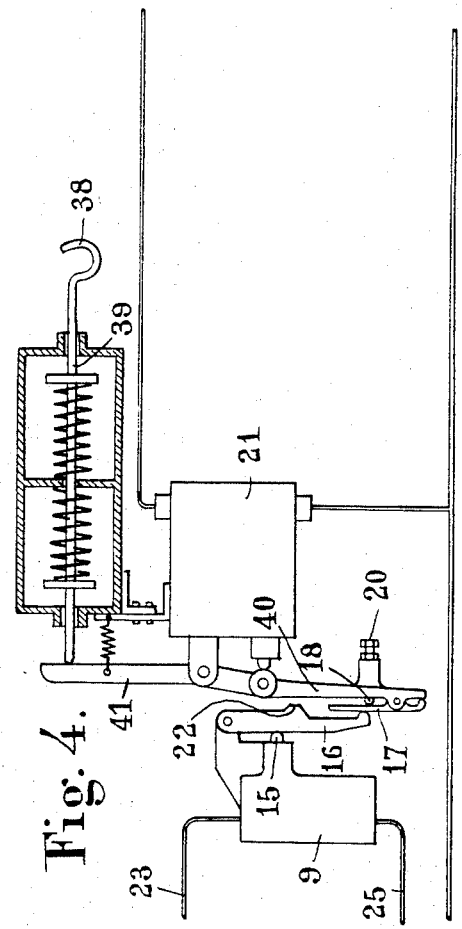

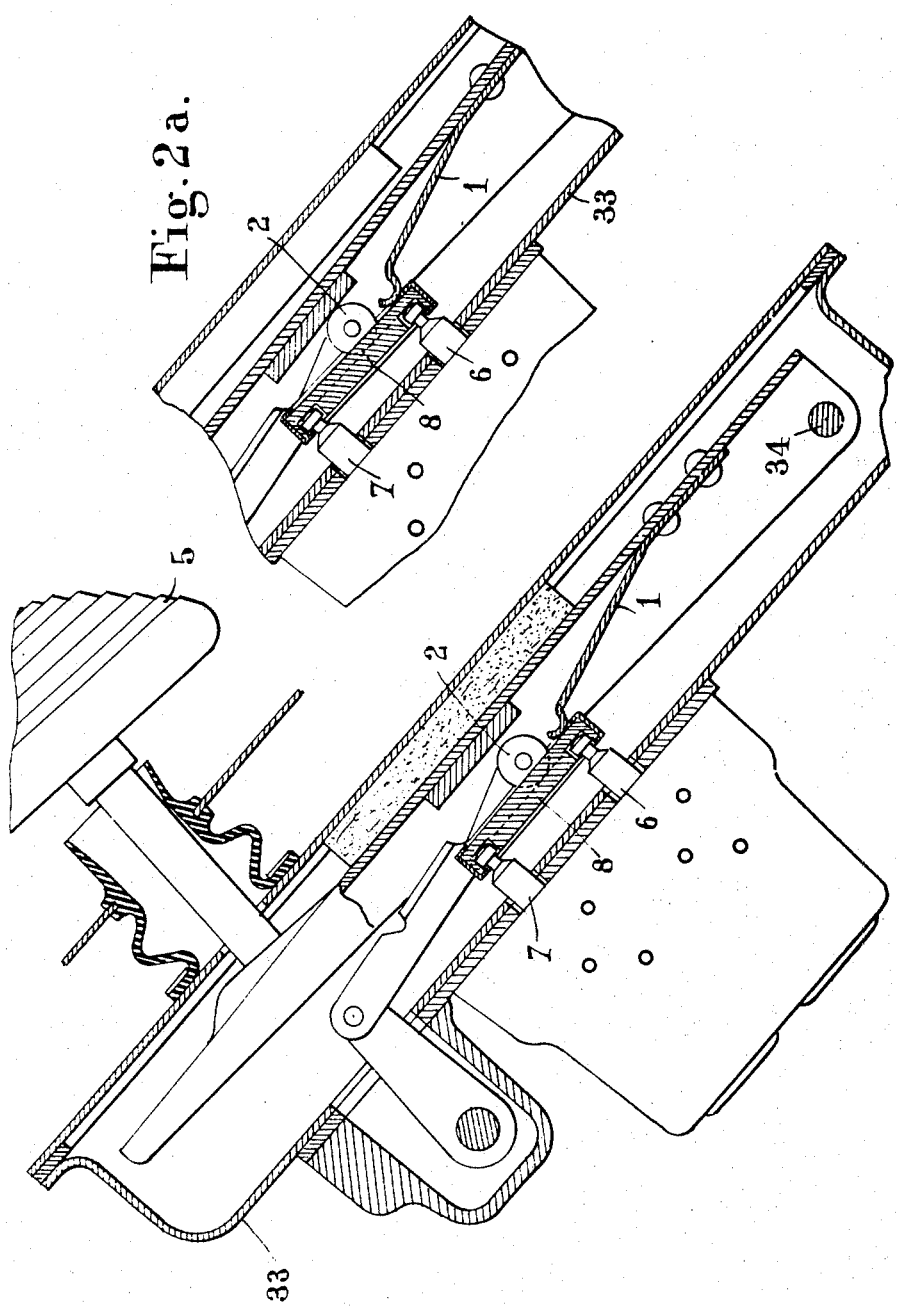

Dec. 10, 1968   E. HENRY-BIABAUD   3,415,579
HYDRAULIC-CONTROL BRAKE SYSTEMS OF VEHICLES
Filed July 10, 1967   4 Sheets-Sheet 3
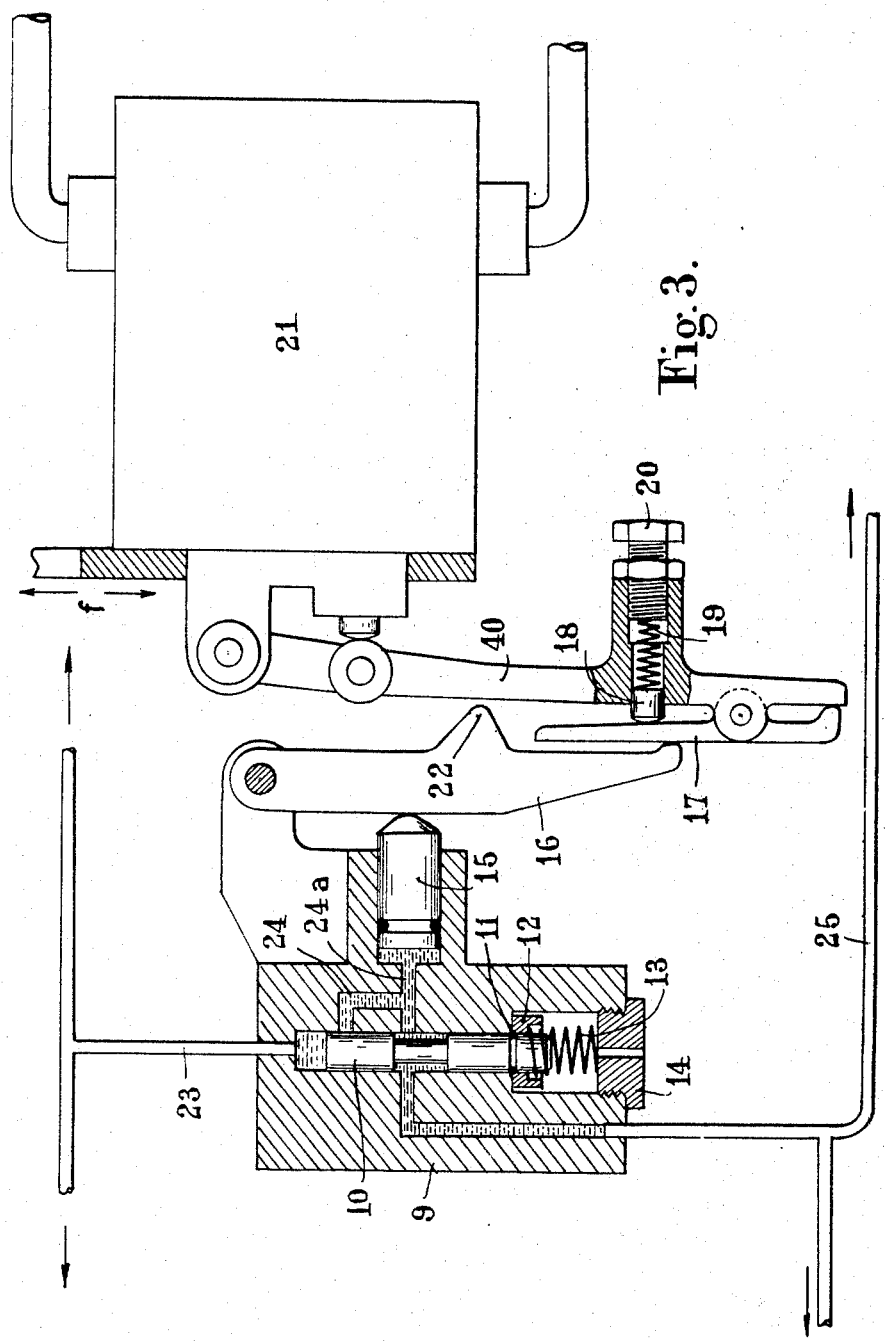

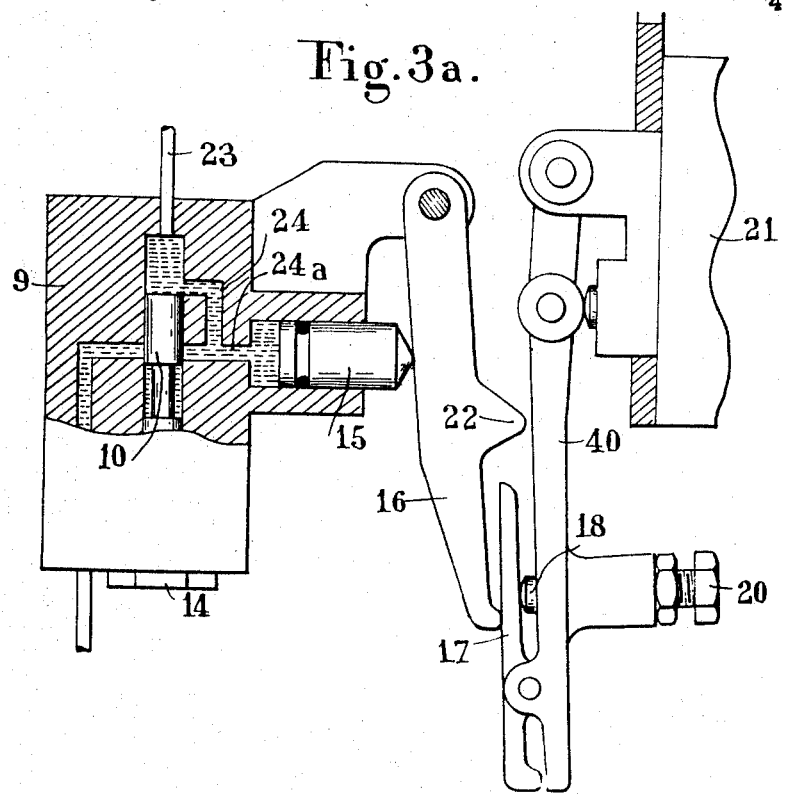
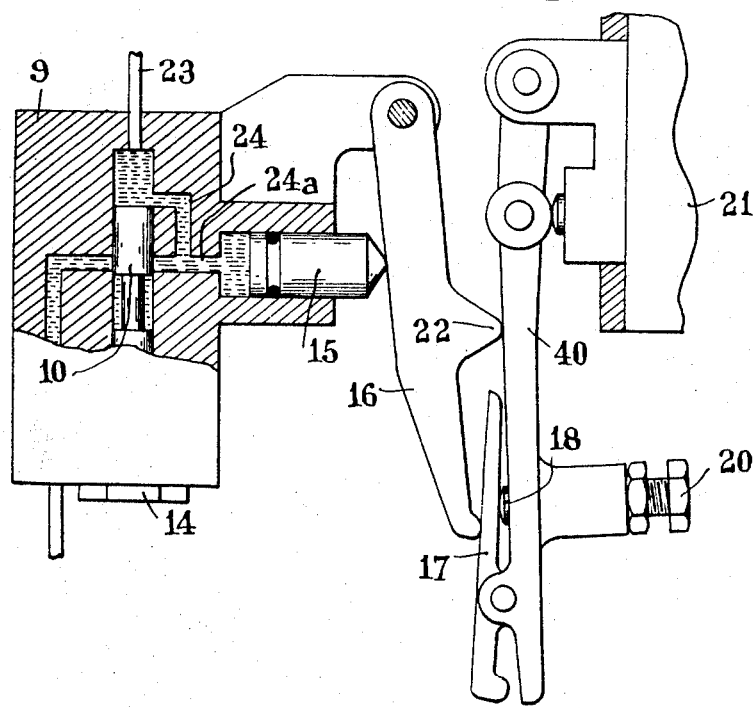

United States Patent Office 3,415,579
Patented Dec. 10, 1968

3,415,579
HYDRAULIC-CONTROL BRAKE SYSTEMS OF VEHICLES
Edmond Henry-Biabaud, Paris, France, assignor to Société Anonyme André Citroen, Paris, France, a French body corporate
Filed July 10, 1967, Ser. No. 652,146
Claims priority, application France, July 18, 1966, 69,722
6 Claims. (Cl. 303—22)

ABSTRACT OF THE DISCLOSURE

Hydraulic system for controlling the braking installation of a vehicle by distributing the braking effort among the trains of wheels of the vehicle as a function of their specific load, in which the distributor comprises means such that when depressed the brake pedal exerts firstly a moderate thrust on the slide valve controlling the hydraulic circuit of the brakes of the rear train of wheels and actuates the rocker only subsequently through the thrust roller.

Field of the invention

This invention relates in general to brake systems of automotive vehicles and has specific reference to the hydraulic control means thereof.

Description of the prior art

Hydraulic control systems of vehicle brakes are known wherein the braking effort is distributed among the trains of wheels as a function of their specific load, the system comprising to this end a distributor wherein slide valves associated with the hydraulic braking circuits of each train of wheels are acted upon by the brake pedal through a rocker, with the interposition of a roller of which the position along said rocker varies automatically as a function of the load carried by the trains of wheels, so that a predominant effort is constantly exerted on the train of wheels carrying the heaviest load.

However, circumstances may arise, especially in the case of traction vehicles, wherein the load distribution in the vehicle structure is such that substantially no load is supported by the train of rear wheels; nevertheless, this train carries its own weight and that of various unsprung members; under these conditions the load distribution as detected by the suspension system gives a wrong result which can be corrected by adequately adjusting the distributor.

Summary of the invention

This invention is concerned with another correction method wherein means are provided whereby the rear brakes are always and automatically operated slightly before the front brakes.

To this end, the hydraulic brake control system for automotive vehicle of the type broadly set forth hereinabove, according to the present invention, is characterized in that the distributor incorporates means such that when the brake pedal is depressed it firstly engages and actuates the slide valve associated with the rear brake hydraulic circuit so as to cause a slight application of the rear brakes, and that said rocker is acted upon only subsequently by said pedal through said thrust roller.

According to another feature characterizing this invention and in case the vehicle is coupled to a semi-trailer equipped with pneumatic or vacuum-operated brakes, a hydraulic safety valve interposed in the hydraulic circuit of the train of rear wheels for controlling the pneumatic or vacuum-operated braking system of the semi-trailer is so arranged that the brake application is effective firstly in the semi-trailer, even before the brakes of the rear axle of the tractor vehicle are applied, this hydraulic safety valve may also be interposed in the hydraulic circuit of the front train of wheels of the tractor so that in case of accidental failure in any one of these two circuits the other circuit will remain operative and capable of controlling the semi-trailer brakes.

Brief description of the drawings

Reference will now be made to the attached drawings illustrating diagrammatically by way of example a typical form of embodiment of this invention. In the drawings:

FIGURE 1 is a diagrammatic view showing the hydraulic and pneumatic brake circuits of the tractor and of the semi-trailer coupled thereto;

FIGURE 2 is a detail and sectional view showing on a larger scale the hydraulic circuit control distributor in its inoperative position, FIGURE 2a showing one fraction of the same distributor in its initial operative position;

FIGURE 3 is a diagrammatic, part-sectional view showing on a larger scale the safety valve in its inoperative position, FIGURES 3a and 3b showing similar views of the valve respectively in its initial operative position and in its fully depressed position;

FIGURE 4 illustrates a specific form of embodiment of the device of this invention.

Description of the preferred embodiments

Referring firstly to FIGURE 1 of the drawings, the tractor vehicle 28 carried by a train of rear wheels 29 and a train of front wheels 30 has coupled thereto a semi-trailer 31 carried by a single train of wheels 32.

The brake pedal 5 controls the application of the brakes associated with the two trains of wheels 29 and 30 of the tractor through the medium of a distributor 33 in which slide valves 6 and 7 control respectively the hydraulic brake circuits 23 of the rear train of wheels, and 25 of the front train of wheels.

To this end, the brake pedal 5 fulcrumed on a pivot pin 34 is adapted to exert its control pressure through the medium of a thrust roller 2 on a rocker 8 bearing on the outer ends of slide valves 6 and 7; the position of the thrust roller 2 between said slide valves 6 and 7 is controlled by means of a mechanical linkage system 35 and a lever 36 of which the position is controlled by a mechanical device 37 as a function of the load carried by the train of rear wheels 29.

To produce a first application of the brakes of the rear train of wheels 29 irrespective of the load, even if the latter is zero and therefore the position of roller 2 be such that a greatly predominant action is exerted on slide valve 7, a lost motion is provided between the brake pedal 5 and roller 2, and the free end of a small spring blade 1 secured to the pedal 5 engages the outer end of slide valve 6; thus, when the pedal 5 is depressed and before it engages the roller 2, this spring blade 1 will exert a slight pressure on slide valve 6 whereby the latter will transmit fluid pressure through the pipe line 23 to the brake shoes 4 of the rear brakes, spring means 3 constantly urging these brake shoes to their inoperative position.

When the pressure exerted by the driver on the brake pedal 5 is increased the action exerted by the spring blade 1 becomes negligible and the braking effort is distributed among the two trains of wheels 29 and 30 in the usual manner as a function of the position of roller 2 in relation to the rocker 8 between slide valves 6 and 7.

If a semi-trailer 31 is coupled to the tractor 28 the hydraulic safety valve 9 communicating with the hydraulic circuits 23 of the rear train of wheels 29 and 25 of the front train of wheels 30 becomes operative to apply the brakes of the semi-trailer axle 32 even before the brakes of the rear train 29 of the tractor vehicle are actuated.

To this end, the hydraulic safety valve 9 consists of a body enclosing the slide valve 10 normally positioned by a circlip 11, a washer 12, a spring 13 and a screw plug 14; a lateral piston 15 is adapted to exert a thrust against the pneumatic system controlling the semi-trailer brakes through the medium of a pair of levers 16, 17, and a spring-loaded bolt 18, 19; a screw 20 provided with a lock-nut permits a more gradual adjustment of the opening of the pneumatic brake control valve 21. The predominant drive system consists of said lever 16, bolt 18, spring 19 and a lever 40. The valve 21 controls the distribution of compressed air from the reservoir (not shown) to the semi-trailer brakes.

This installation operates as follows:

When the driver depresses the brake pedal 5 the fluid pressure resulting from the operation of distributor 33 is transmitted through the rear brake hydraulic circuit line 23, whereby slide valve 10 is moved downwards (as seen in FIGURES 3, 3a and 3b), whereby pipe line 23 and duct 24 will communicate with each other and cause this pressure to be exerted against piston 15 which, by actuating the lever 16, permits the opening of valve 21 to open the pneumatic circuit for controlling the semi-trailer brakes.

The predominance of the semi-trailer brake application over the tractor brake application is obtained as follows:

The fluid pressure from the rear brake hydraulic circuit which corresponds to the pressure exerted by the spring blade 1 causes the rear brakes 4 of the tractor to be operated but without actually braking the tractor, since this pressure is compensated by the return springs 3 of the brake shoes. As this pressure is also fed to the safety valve, it actuates the lever 16 and the semi-trailer brakes through the medium of piston 15.

The ratios of levers 16 and 17 and the position of their points of mutual engagement are such that the valve 21 opens sufficiently to cause the semi-trailer brakes to be applied before the tractor brakes (see FIGURE 3a). Further depressing the brake pedal (and as a function of the transfer of loads upon the rear axle of the tractor) will bring the roller 2 nearer to slide valve 6 and thus cause the latter to be depressed, whereby the maximum requisite pressure is transmitted on the one hand to the semi-trailer through the engagement of the projection 22 on lever 16 (see FIGURE 3) and on the other hand to the tractor. Under these conditions the front brakes of the tractor will be applied only subsequently, that is, when the reaction produced on slide valve 6 has attained a sufficient value.

In case of failure of pipe line 23 the hydraulic fluid fed from distributor 33 through this line will be drained to the outside, and the fluid from pipe line 25 will control the brake system as follows:

Due to the absence of pressure in pipe line 23, slide valve 10 is closed by its return spring 13 and thus the pipe line 25 is caused to communicate with duct 24a, so that the semi-trailer brakes will be operated as in the preceding case.

In case of failure in pipe line 25 the reverse operation takes place.

In all cases the semi-trailer brakes are controlled through one or the other circuit.

By adjusting the position of valve 21 in the direction of the arrows f (FIGURE 3) the position of lever 17 is altered accordingly and the semi-trailer brakes can thereby be adjusted as desired.

As illustrated in FIGURE 4, the braking systems of semi-trailers can be controlled automatically by using a coupling hook 38 disposed on the rear end of a rod 39 adapted to slide to a limited extent in its two axial directions and engaging with its front end an extension 41 of the lever 40 controlling the valve 21.

What I claim is:

1. A braking system for an articulated vehicle consisting of a tractor having a first axle at the front and a second axle at the rear, and a trailer having only a single axle, said system comprising on said tractor devices for braking said first axle and second axle respectively, a compressed hydraulic fluid distributor comprising first and second reaction slide valves, first and second pipe lines for delivering compressed hydraulic fluid to said braking devices of said first and second axles respectively, the corresponding slide valve being adapted, when actuated, to control the delivery of said compressed hydraulic fluid to the relevant one of said pipe lines under a pressure proportional to the force acting upon said slide valve, a rocker overlying both slide valves, a roller disposed on said rocker and means adapted to move said roller in the direction from said rear slide valve to said front slide valve in a manner responsive to the load of said second tractor axle, a brake control pedal pivotally mounted above said distributor, a spring secured under said pedal and having a lower end in constant engagement with said rocker above said second slide valve so as to keep said pedal slightly spaced above said roller, a branch line in said second compressed hydraulic fluid pipe line and a trailer's brake control valve connected to said branch line of said second compressed hydraulic fluid pipe line, and, on said trailer, means for braking said single axle, and a feed valve for controlling the supply of compressed actuating air to said braking means, said compressed-air control valve being operatively connected to said tractor valve and adapted to be opened thereby when compressed hydraulic fluid is delivered to said tractor valve.

2. A braking system for an articulated vehicle as set forth in claim 1, wherein the resilient reaction of said spring on said rocker, when said brake control pedal has deflected said spring until said pedal engages said roller, is adapted to control the delivery of hydraulic compressed fluid to said second pipe line under a pressure sufficient to control through said tractor valve the opening of said feed valve and the application of the trailer's brakes, and not sufficient to actuate under effective braking conditions the braking devices of said trailer's axle.

3. A braking system for an articulated vehicle as set forth in claim 1, wherein said valve comprises a body, a piston having one end disposed internally of said body and responsive to the action of the compressed hydraulic fluid supplied to said valve, and another end disposed externally of said body, a transmission lever pivoted to said valve body and having a rear face responsive to said outer end of said piston and a front face adapted to co-act with said feed valve, said feed valve comprising a body, a pivot secured to said body externally thereof and a control lever fulcrumed on said pivot and having a rear face engageable by said front face of said transmission lever of said valve, said front face of said transmission lever being shaped for engagement with said rear face of said control lever at a point moving toward said lever pivot when said piston is moved outwardly of said valve body.

4. A braking system for an articulated vehicle as set forth in claim 3, which comprises an adjustable spring acting against said rear face of said control lever at the point of said control lever which is engaged by said front face of said transmission lever, as long as said piston is not moved outwardly of said valve body.

5. A braking system for an articulated vehicle as set forth in claim 3, which comprises means for causing the movement of said feed valve body in order to adjust the position of said point of engagement of said front face of said transmission lever with said rear face of said control lever in relation to the pivot of said control lever.

6. A braking system for an articulated vehicle as set forth in claim 1, which further comprises on said tractor a branch line extending from said first hydraulic compressed fluid pipe line, said branch line being connected to said valve, said device being of the type having two fluid inlets and adapted to be actuated by that one of said two branch lines of said first and second pipe lines in which the hydraulic fluid has attained the highest pressure.

References Cited
UNITED STATES PATENTS

| | | | |
|---|---|---|---|
| 2,652,904 | 9/1953 | Whitten | 303—7 |
| 2,929,660 | 3/1960 | Brueder | 303—22 |
| 2,976,084 | 3/1961 | Brueder | 303—22 XR |
| 3,284,141 | 11/1966 | Henry-Biabaud | 303—7 |

MILTON BUCHLER, *Primary Examiner*

J. J. McLAUGHLIN, *Assistant Examiner*

U.S. Cl. X.R.

303—7, 56